United States Patent Office 3,845,133
Patented Oct. 29, 1974

3,845,133
ALICYCLIC DIKETONES AND PROCESS FOR
THEIR MANUFACTURE
Amnon Mordechai Cohen, Amersfoort, Netherlands, assignor to Polak's Frutal Works N.V., Amersfoort, Netherlands
No Drawing. Filed Nov. 3, 1971, Ser. No. 195,480
Claims priority, application Great Britain, Nov. 4, 1970, 52,389/70
Int. Cl. C07c 45/00, 49/46
U.S. Cl. 260—586 R    7 Claims

ABSTRACT OF THE DISCLOSURE

New alicyclic diketones represented by the generic formula

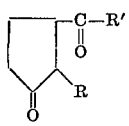

in which R represents a hydrocarbon radical containing from 4 to 7 carbon atoms, and R' is methyl, ethyl or propyl, are prepared by reacting nitroalkanes with 2-alkyl-2-cyclopentenone to produce the corresponding cyclic nitroketones, which are then converted in a Nef-type reaction into the corresponding cyclic diketones.

The new compounds have olfactory properties and are useful in the production of a great variety of perfume compositions.

---

This invention relates to new cyclic diketones, more particularly to 2-alkyl-3-acylcyclopentanones, which possess interesting olfactive properties and therefore are useful in the preparation of a great variety of perfume compositions.

The compounds of this invention can be represented by the following general formula:

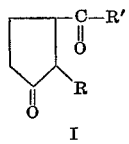

wherein R represents a hydrocarbon radical having from 4 to 7 carbon atoms and R' represents methyl, ethyl and propyl.

The substituent represented by R in the above formula I can be a straight-chain alkyl radical such as n-butyl, n-pentyl, n-hexyl and n-heptyl, a branched alkyl radical, i.e., a secondary or tertiary alkyl radical, or a cycloaliphatic radical.

The diketones represented by formula I can be prepared by reacting nitroalkanes with 2-alkyl-2cyclopentenone to yield the corresponding cyclic nitroketones, which are further converted in a Nef type reaction into the corresponding cyclic diketone. This synthesis can be illustrated by the following reaction scheme:

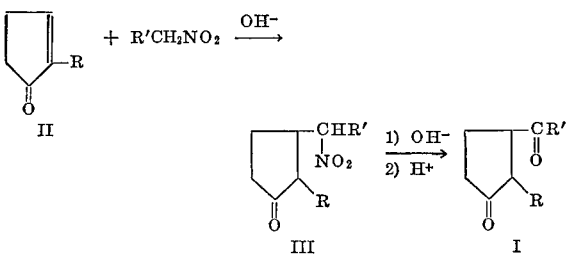

The addition of nitroalkanes to 2-alkyl-2-cyclopentenones (II) can be conducted in the presence of a great variety of basic catalysts in different solvents, of which benzyltrimethylammonium hydroxide (triton B) in dioxane and sodium alkoxide in methanol or ethanol were found to be the most effective.

The Nef reaction can also be carried out directly (without isolation of the intermediate III) with the reaction mixtures resulting from the addition of nitroalkanes to 2-alkyl-2-cyclopentenones in alcoholic solutions in the presence of an equivalent amount of alkoxide, as shown by the following reaction scheme:

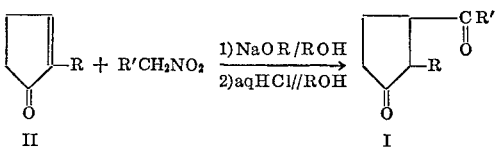

The yields of the different methods are comparable. However, isolation of the intermediate nitroketones (III) is in some cases advantageous, since the differences in boiling points between some of the cyclic diketones (I) and their corresponding cyclopentenones (II) are rather small.

Most of the starting 2-alkyl-2-cyclopentenones used for carrying out this process are known compounds. As far as they are new, known methods can be employed for their preparation.

The cyclic diketones of this invention are new fragrant substances which possess very characteristic olfactive properties. They develop clean, characteristic and very natural floral odours which grow to a very exalting and longlasting fragrance on standing on evaporation-blotter-strips, on the skin etc. The new substances have good fragrance-modifying properties which are clearly demonstrated when the new substances are mixed with other odoriferous materials and compositions of the floral, woody, musky and fancy types. Especially their fixative properties are strikingly demonstrated in developing tenacious and very elegant notes in many perfumes. When used in compositions, the proportions of natural flower concrets and absolutes can be lowered considerably.

In perfumery compositions the new substances produce the desired effects in a very wide range from 0.1 to 15%, while in floral bases used as additives for other compositions, the new compounds can be used in proportions of 30% or more by weight.

EXAMPLES

Example 1

Preparation of 2-n-hexyl-3-acetylcyclopentenone (method A)

(a) Preparation of 2-n-hexyl-3-(1'-nitroethyl)cyclopentenone: In a 0.5 l. flask fitted with a reflux condenser, is placed 100 g. of 2-n-hexyl-2-cyclopentenone (see footnote (1) under the following table), 60 g. of nitroethane, 7 ml. of 40% methanolic solution of benzyltrimethylammonium hydroxide (Triton B) and 40 ml. of dry dioxane. The reaction mixture is boiled under reflux for 20 hours. The solvent is distilled off at reduced pressure and the residue is dissolved in 300 ml. of ether. The ether solution is washed with dilute hydrochloric acid, water and sodium bicarbonate solution successively and dried over anhydrous sodium sulphate. The solvent is removed at atmospheric pressure and the residue is distilled through a short Vigreux column. After a lower boiling fraction (21 g., 65–70° C./0.2 mm.) consisting of 2-n-hexyl-2-cyclopentenone, the product, 2-n-hexyl-3-(1-nitroethyl)cyclopentanone, is collected at 122° C./0.15 mm. yield 101 g. (70%), $n_D^{20}$ 1.4727.

(b) Preparation of 2-n-hexyl-3-acetylcyclopentanone: In a 10.1 three necked flask fitted with a mechanical stirrer a thermometer, a dropping funnel and a nitrogen inlet tube, is placed 545 ml. of 2,5N-sodium hydroxide in 80% methanol. Dry nitrogen is let in and 84 g. of 2-n-hexyl-3-(1' - nitroethyl)cyclopentanone is added with vigorous stirring over a period of 5 minutes. The reaction mixture is stirred at room temperature for 1 hour and then diluted with 4000 ml. of 80% methanol. The reaction mixture is cooled to 0° C. and 480 ml. of concentrated hydrochloric acid are added with vigorous stirring over a period of one hour. The temperature of the mixture is held at 0° C. during the addition. The reaction mixture is stirred at 0° C. for an additional 30 minutes and for one hour at room temperature. The methanol is removed at reduced pressure and the residue is extracted several times with ether. The combined ether solutions are washed with water and sodium bicarbonate solution successively and dried over anhydrous sodium sulphate. The solvent is removed by distillation at atmospheric pressure and the residue is distilled through a short Vigreux column. The product, 2-n-hexyl-3-acetylcyclopentanone is collected at 89° C./0.05 mm., yield 58.5 g. (80%), $n_D^{20}$ 1.4644.

Example 2

Preparation of 2-n-hexyl-3-propionylcyclopentanone (method B)

(a) Preparation of 2-n-hexyl-3-(1'-nitropropyl)cyclopentanone: In a 0.5 l. three necked flask fitted with a mechanical stirrer, a dropping funnel and a reflux condenser, protected by a calcium chloride drying tube, is placed a solution of 5.4 g. of sodium methoxide in 120 ml. of absolute methanol. To the vigorously stirred solution is added at room temperature, 13.3 g. of 1-nitropropane over a period of 10 minutes. The reaction mixture is stirred for an additional 45 minutes and then 16.6 g. of 2-n-hexyl-2-cyclopentenone is added. The reaction mixture is stirred at reflux temperature for 3 hours. The flask is then cooled in an ice bath and the contents are acidified with 7 ml. of acetic acid. The methanol is removed at reduced pressure and the residue is poured into a large excess of water. The organic layer is separated and the water phase is extracted several times with ether. The combined ether solutions are washed successively with water and sodium hydrogen carbonate solution and dried over anhydrous sodium sulphate. The solvent is removed at atmospheric pressure and the residue is distilled through a short Vigreux column. After a lower boiling fraction (2.1 g. 65° C./0.2 mm.) consisting of 2-n-hexyl-2-cyclopentenone, the product, 2-n-hexyl-3-(1'-nitropropyl)cyclopentanone, is collected at 122–123° C./0.11 mm.; yield 18.6 g. (73%) $n_D^{20}$ 1.4717.

(b) Preparation of 2-n-hexyl-3-propionylcyclopentanone: In a 0.5 l. three necked flask fitted with a mechanical stirrer, a dropping funnel and a nitrogen inlet tube, is placed a solution of 10.8 g. of sodium methoxide in 200 ml. of methanol. Nitrogen is let in and 25.5 g. of 2-n-hexyl-3-(1'-nitropropyl)cyclopentanone is added over a period of 5 minutes. The reaction mixture is stirred at room temperature for one hour and then added dropwise during one hour to a well stirred mixture of 450 ml. of 10% hydrochloric acid and 300 ml. of methanol, under nitrogen atmosphere. The temperature of the mixture is held at 0° C. during the addition. The reaction mixture is stirred at 0° C. for an additional 90 minutes and then for 2 hours at room temperature. The methanol is removed at reduced pressure and the residue is extracted several times with ether. The combined ether extracts are washed successively with water and sodium hydrogencarbonate solution and dried over anhydrous sodium sulphate. The solvent is removed at atmospheric pressure and the residue is distilled through a short Vigreux column. The product, 2-n-hexyl-3-propionylcyclopentanone, is collected at 105° C./0.2 mm., yield 13.5 g. (60%), $n_D^{20}$ 1.4664.

Example 3

Preparation of 2-n-hexyl-3-propionylcyclopentanone (method C)

In a 0.5 l. three necked flask fitted with a mechanical stirrer, a dropping funnel, a nitrogen inlet tube, and a reflux condenser, protected by a calcium chloride drying tube, is placed a solution of 13 g. sodium methoxide in 200 ml. of absolute methanol. Dry nitrogen is let in and 21.4 g. of 1-nitropropane is added over a period of 5-minutes. The reaction mixture is stirred at room temperature for one hour and then 33.2 g. of 2-n-hexyl-2-cyciopentenone is added in one portion. The reaction mixture is stirred at room temperature for 3 hours and then cooled to 0° C. The cold reaction mixture is then added dropwise during one hour to a well stirred mixture of 900 ml. of 10% hydrochloric acid and 600 ml. of methanol, under nitrogen atmosphere. The temperature of the mixture is held at 0° C. during the addition. The reaction mixture is stirred at 0° C. for an additional 2 hours and for 2 hours at room temperature. The reaction mixture is worked up in the same way as described in Example 2(b). After a lower boiling fraction (3.3 g., 75° C./0.5 mm.) consisting of 2-n-hexyl-2-cyclopentenone, the product, 2-n-hexyl-3-propionylcyclopentanone is collected at 122–125° C./0.3 mm., yield 21.3 g. (48%), $n_D^{20}$ 1.4667.

The homologous cyclic diketones and the intermediate nitroketones listed in the following table, were prepared following the general methods described above.

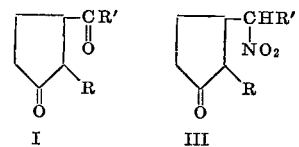

I     III

| Example [1] | Method | R | R' | Kpt. mm. Hg I | Kpt. mm. Hg III | $n_D^{20}$ I | $n_D^{20}$ III | Yield, percent |
|---|---|---|---|---|---|---|---|---|
| 4 | A | n-C$_4$H$_9$ | CH$_3$ | 66° C./0.08 | 100° C./0.2 | 1.4628 | 1.4736 | 50 |
| 5 | A | n-C$_4$H$_9$ | C$_2$H$_5$ | 76° C./0.15 | 98° C./0.15 | 1.4631 | 1.4715 | 46 |
| 6 | B | n-C$_5$H$_{11}$ | CH$_3$ | 91° C./0.1 | 122° C./0.3 | 1.4626 | 1.4723 | 45 |
| 7 | B | n-C$_5$H$_{11}$ | C$_2$H$_5$ | 98° C./0.18 | 118° C./0.13 | 1.4629 | 1.4710 | 35 |
| 8 | A | Iso-C$_5$H$_{11}$ | CH$_3$ | 73° C./0.1 | 120° C./0.5 | 1.4631 | 1.4726 | 50 |
| 9 | A | Iso-C$_5$H$_{11}$ | C$_2$H$_5$ | 80° C./0.1 | 110° C./0.35 | 1.4644 | 1.4711 | 42 |
| 10 | A | Cyclo-C$_5$H$_9$ | CH$_3$ | 90° C./0.15 | 106° C./0.06 | 1.4965 | 1.4979 | 40 |
| 11 | A | Cyclo-C$_5$H$_9$ | C$_2$H$_5$ | 100° C./0.1 | 110° C./0.1 | 1.4907 | 1.4947 | 35 |
| 12 | C | n-C$_6$H$_{13}$ | CH$_3$ | 96° C./0.25 | | 1.4642 | | 55 |
| 13 | C | n-C$_6$H$_{13}$ | n-C$_3$H$_7$ | 111° C./0.15 | | 1.4658 | | 40 |
| 14 | B | n-C$_7$H$_{15}$ | CH$_3$ | 108° C./0.1 | 133° C./0.15 | 1.4631 | 1.4716 | 52 |
| 15 | B | n-C$_7$H$_{15}$ | C$_2$H$_5$ | 118° C./0.2 | 137° C./0.15 | 1.4640 | 1.4711 | 35 |

[1] The following 2-alkyl-2-cyclopentenones used for the preparation of I and III were prepared from the corresponding alkylidenecyclopentanones (G. Lardelli et al. Rec. Trav. Chim. 86, 481 (1967) according to the method of J. M. Conia, Bull. Soc. Chim. France, 8, 3327 (1968)): 2-n-butyl-2-cyclopentenone (B.P. 42° C./0.02 mm.; $n_D^{20}$ 1.4732); 2-n-pentyl-2-cyclopentenone (B.P. 64° C./0.05 mm.; $n_D^{20}$ 1.4738); 2-iso-pentyl-2-cyclopentenone (B.P. 58° C./0.08 mm.; $n_D^{20}$ 1.4724); 2-n-hexyl-2-cyclopentenone (B.P. 60° C./0.05 mm.; $n_D^{20}$ 1.4724); 2-n-heptyl-2-cyclopentenone (B.P. 75° C./0.06 mm.; $n_D^{20}$ 1.4722); 2-cyclopentyl-2-cyclopentenone; (Conia loc. cit.).

Note.—The values given in the table are the overall yields of I from the corresponding alkyl cyclopentenone.

We claim:
1. New compounds having the structure:

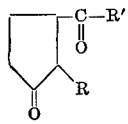

wherein R represents an alkyl radical having from 4 to 7 carbon atoms; and R' represents an alkyl radical containing from 1 to 3 carbon atoms.

2. A process for the manufacture of an alicyclic diketone which comprises reacting a 2-alkyl-2-cyclopentenone having the general formula

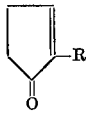

wherein R represents an alkyl radical having 4 to 7 carbon atoms with a nitro-alkane in methanol or ethanol solution in the presence of at least one equivalent of an alkaline metal alkoxide at room temperature, and thereafter adding thereto an excess of a mineral acid at a temperature not exceeding about 0° C.

3. The process of claim 2 wherein said mineral acid is dilute hydrochloric acid.

4. A process for the manufacture of an alicyclic diketone which comprises (a) reacting a 2-alkyl-2-cyclopentenone having the general formula

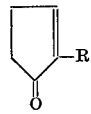

wherein R represents an alkyl radical having 4 to 7 carbon atoms with a nitro-alkane in the presence of benzyltrimethyl ammonium hydroxide as a catalyst in dioxane to yield the corresponding nitroketone of the general formula

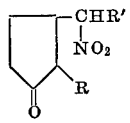

wherein R' represents an alkyl radical containing 1 to 3 carbon atoms, (b) recovering the nitroketone product, and (c) reacting said corresponding nitroketone in methanol or ethanol solution in the presence of an alkaline metal alkoxide and thereafter adding a mineral acid at a temperature not exceeding about 0° C.

5. The process of claim 4 wherein said mineral acid is hydrochloric acid.

6. The process of claim 5 wherein said hydrochloric acid is concentrated hydrochloric acid.

7. A process for the manufacture of an alicyclic diketone which comprises (a) reacting a 2-alkyl-2-cyclopentenone having the general formula

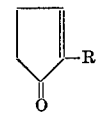

wherein R represents an alkyl radical having 4 to 7 carbon atoms with a nitro-alkane in the presence of sodium alkoxide as a catalyst in an inert solvent selected from the group consisting of methanol and ethanol to yield the corresponding nitroketone of the general formula

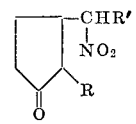

wherein R' represents an alkyl radical containing 1 to 3 carbon atoms, (b) recovering the nitroketone product and (c) reacting said corresponding nitroketone in methanol or ethanol solution in the presence of an alkaline metal alkoxide and thereafter adding a mineral acid at a temperature not exceeding about 0° C.

References Cited
FOREIGN PATENTS
2,049,004   3/1971   France _____ 260—586 R

HOWARD T. MARS, Primary Examiner
N. MORGENSTERN, Assistant Examiner

U.S. Cl. X.R.
242—522